US009719223B2

(12) United States Patent
Johnson (10) Patent No.: US 9,719,223 B2
(45) Date of Patent: Aug. 1, 2017

(54) SIFTING PICK-UP DEVICE (71) Applicant: Marcia Johnson, Kennesaw, GA (US)

(72) Inventor: Marcia Johnson, Kennesaw, GA (US)

( * ) Notice: Subject to any disclaimer, the term of this patent is extended or adjusted under 35 U.S.C. 154(b) by 0 days.

(21) Appl. No.: 15/190,298

(22) Filed: Jun. 23, 2016

(65) Prior Publication Data
US 2016/0376760 A1    Dec. 29, 2016

Related U.S. Application Data (60) Provisional application No. 62/183,245, filed on Jun. 23, 2015.

(51) Int. Cl.
*A01K 29/00* (2006.01)
*E01H 1/12* (2006.01)

(52) U.S. Cl.
CPC ... *E01H 1/1206* (2013.01); *E01H 2001/1293* (2013.01)

(58) Field of Classification Search
CPC .......... E01H 1/1206; E01H 2001/1293; E01H 2001/1246; E01H 1/12
USPC ......... 294/1.4, 1.3, 1.5, 50.8, 50.9, 178, 179
See application file for complete search history.

(56) References Cited

U.S. PATENT DOCUMENTS

| | | | |
|---|---|---|---|
| 4,316,627 A * | 2/1982 | Solypa | E01H 1/1206 15/257.6 |
| 4,828,690 A | 5/1989 | Montez | |
| 5,417,044 A | 5/1995 | Russo | |
| 5,536,055 A * | 7/1996 | Kohn | A01K 1/0114 209/418 |
| 5,921,596 A | 7/1999 | Sheriff | |
| 6,003,913 A | 12/1999 | Flumiani | |
| 7,111,741 B2 | 9/2006 | Bramante | |
| 7,862,094 B1 * | 1/2011 | Lamont | A47L 13/52 294/1.3 |
| 8,292,338 B1 * | 10/2012 | Baghdasaryan | E01H 1/1206 294/1.3 |
| 8,695,807 B2 | 4/2014 | Knittel | |
| 9,469,951 B1 * | 10/2016 | Qi | E01H 1/1206 |
| 2007/0194580 A1 * | 8/2007 | Raasch | E01H 1/1206 294/1.4 |
| 2009/0278366 A1 * | 11/2009 | Lipscomb | A01K 1/0114 294/1.4 |
| 2013/0062896 A1 * | 3/2013 | Ahern | A01K 29/00 294/1.4 |
| 2014/0327256 A1 * | 11/2014 | Zurn | E01H 1/1206 294/1.4 |

(Continued)

*Primary Examiner* — Gabriela Puig
(74) *Attorney, Agent, or Firm* — Daniel Boudwin; Global Intellectual Property Agency, LLC.

(57) ABSTRACT

A sifting pick-up device is provided that operates as a combined pick-up tool and sifter. The device comprises an elongated frame, a first jaw member, and a second jaw member. The elongated frame includes a proximal end, a distal end, and a slidable handle therealong. The two jaw members are disposed along the distal end and move relative to one another based on movement of the slidable handle. At least one of the jaw members has a sifting screen jaw surface in which contents secured between the jaws can be separated from granular material. One or both of the jaw members are movable, and in one embodiment the slidable handle is spring biased and is connected to at least one jaw member via one or more cables. The handle controls the position of the jaws, which can be used to pick-up items and sift the same.

11 Claims, 5 Drawing Sheets

(56) References Cited

U.S. PATENT DOCUMENTS

2014/0339839 A1* 11/2014 Levkus ................... B25J 1/04
                                                    294/1.4
2015/0167264 A1*  6/2015 Naseem ............... E01H 1/1206
                                                    294/1.4

* cited by examiner

SIFTING PICK-UP DEVICE

CROSS REFERENCE TO RELATED APPLICATION

This application claims the benefit of U.S. Provisional Application No. 62/183,245 filed on Jun. 23, 2015. The above identified patent application is herein incorporated by reference in its entirety to provide continuity of disclosure.

BACKGROUND OF THE INVENTION

Field of the Invention

The present invention relates to pick-up tools and devices for collecting refuse and waste. More specifically, the present invention relates to a pick-up tool that can be used to grasp refuse, dirt, or waste, and sift the same. An exemplary use of the present invention is picking up manure while sifting out and preserving stall bedding material or other elements that may be inadvertently picked up in the process.

The present invention is a general purpose pick-up tool with a sifting function. In one contemplated use, the device can be used to pick up animal droppings and manure. In farm or horse stable environments, cleaning out a stall can be time consuming work. Tools typically include shovels, muck rakes, and other tools to clean out manure therefrom. While these tools are useful, they can be ineffective in gathering all manure for removal, particular smaller pieces that are difficult to pick up individually. Small pieces can drop to the ground and become littered across the stall, requiring hand clean up or residual waste left in the stall. Therefore, a pick-up tool is useful for gathering smaller clumps and removing the same.

However, while gathering smaller quantities with a pick-up tools is desired, so too is retaining the stall bedding during the cleaning process. Therefore, a need exists for a pick-up device that can remove manure and other items while sifting and preserving reusable stall bedding and other elements, such as pine shavings and the like. The present invention provides a sifting pick-up tool. The tool is adapted to scoop waste or other material while sifting granular material therefrom. The tool comprises an elongated frame with a pair of jaw members along one end. The jaw members can be moved relative to one another using a slidable handle along the frame, while the jaw members are biased to remain in an open or closed state. While picking up waste and other material, loose and granular material is sifted through a mesh sifting screen disposed along one or both of the jaw members. Overall, the tool provides an effective means for cleaning animal stalls and sifting waste removed therefrom.

SUMMARY OF THE INVENTION

The following summary is intended solely for the benefit of the reader and is not intended to be limiting in any way. The present invention provides a new combination pick-up tool and sifter that can be utilized for providing convenience for the user when picking up items and sifting the items of loose material.

It is therefore an object of the present invention to provide a new and improved sifting pick-up device that has all of the advantages of the prior art and none of the disadvantages.

It is another object of the present invention to provide a sifting pick-up device comprising an elongated frame having a length, a proximal end, and a distal end. Along the distal end of the elongated frame is a first jaw member and a second jaw member.

Another object of the present invention is to provide a sifting pick-up device further comprising a slidable handle disposed along the elongated frame, whereby the slidable handle is slidable along the length thereof and controls the position of the first jaw member and second jaw member.

Another object of the present invention is to provide a sifting pick-up device wherein the slidable handle is coupled to at least one of the first jaw member or second jaw member. Movement of the slidable handle in a first direction along the elongated frame is adapted to move the first jaw member relative to the second jaw member.

Another object of the present invention is to provide a sifting pick-up device wherein the slidable handle is spring biased to return to a starting position.

Another object of the present invention is to provide a sifting pick-up device wherein the first jaw member and the second jaw member each further comprises a jaw surface with an upstanding perimeter. The jaw surface of the first jaw member further comprises a sifting screen.

Another object of the present invention is to provide a sifting pick-up device wherein the upstanding perimeter of the first jaw member and the upstanding perimeter of the second jaw member overlap one another or align when the slidable handle is moved in the first direction and when the first jaw member and second jaw member are in a closed state. When in a closed state, the first jaw member and the second jaw member form an enclosed interior volume.

Another object of the present invention is to provide a sifting pick-up device wherein the elongated frame further comprises an open interior within which the slidable handle slides therein. The slidable handle is coupled to the one of the first jaw member or second jaw member or both via one or more cables. When the slidable handle is moved in a first direction, the handle tensions the cables and draws the jaw members together.

Another object of the present invention is to provide a sifting pick-up device wherein the first direction of the slidable handle is a direction towards the proximal end of the elongated frame.

Another object of the present invention is to provide a sifting pick-up device wherein the slidable handle further comprises a rectangular base and an upstanding handle arm. The rectangular base also includes side members disposed within channels along the open interior of the elongated frame. The rectangular base slides within the open interior of the elongated frame, whereby the side members engage the channels therealong.

Another object of the present invention is to provide a sifting pick-up device wherein the first jaw member is pivotably attached to the distal end of the elongated frame and the second jaw member is fixed relative to the elongated frame. Alternatively, the second jaw member may be pivotably attached to the distal end of the elongated frame and the first jaw member is fixed relative to the elongated frame.

Another object of the present invention is to provide a sifting pick-up device wherein the proximal end of the elongated frame further comprises a handle grip.

A final object of the present invention is to provide a sifting pick-up device wherein the jaw surface of the second jaw member further comprises a solid surface.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself

DETAILED DESCRIPTION OF THE INVENTION

Reference is made herein to the attached drawings. Like reference numerals are used throughout the drawings to depict like or similar elements of the sifting pick-up device of the present invention. For the purposes of presenting a brief and clear description of the present invention, the preferred embodiment will be discussed as used for picking up items and sifting granular, loose, or liquid material therefrom. The figures are intended for representative purposes only and should not be considered to be limiting in any respect.

Figure 1:
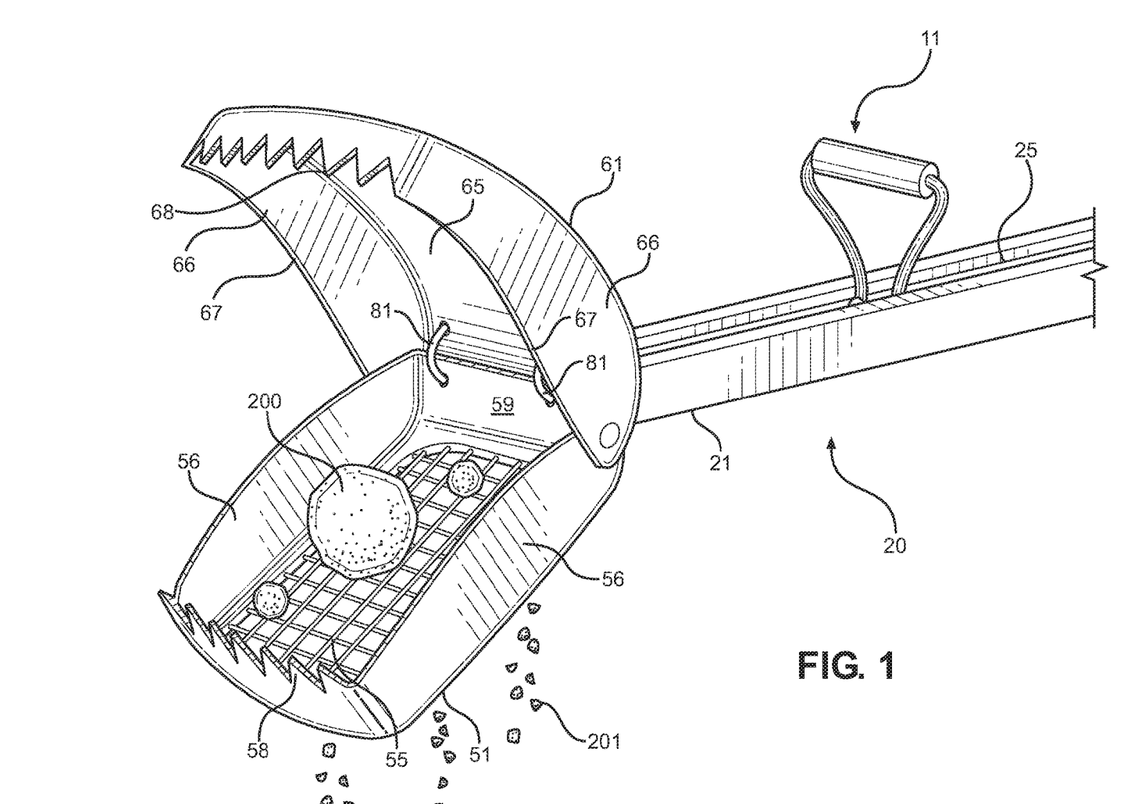
FIG. 1 shows a view of the jaw members along the distal end of the sifting pick-up device of the present invention.
Figure 2:
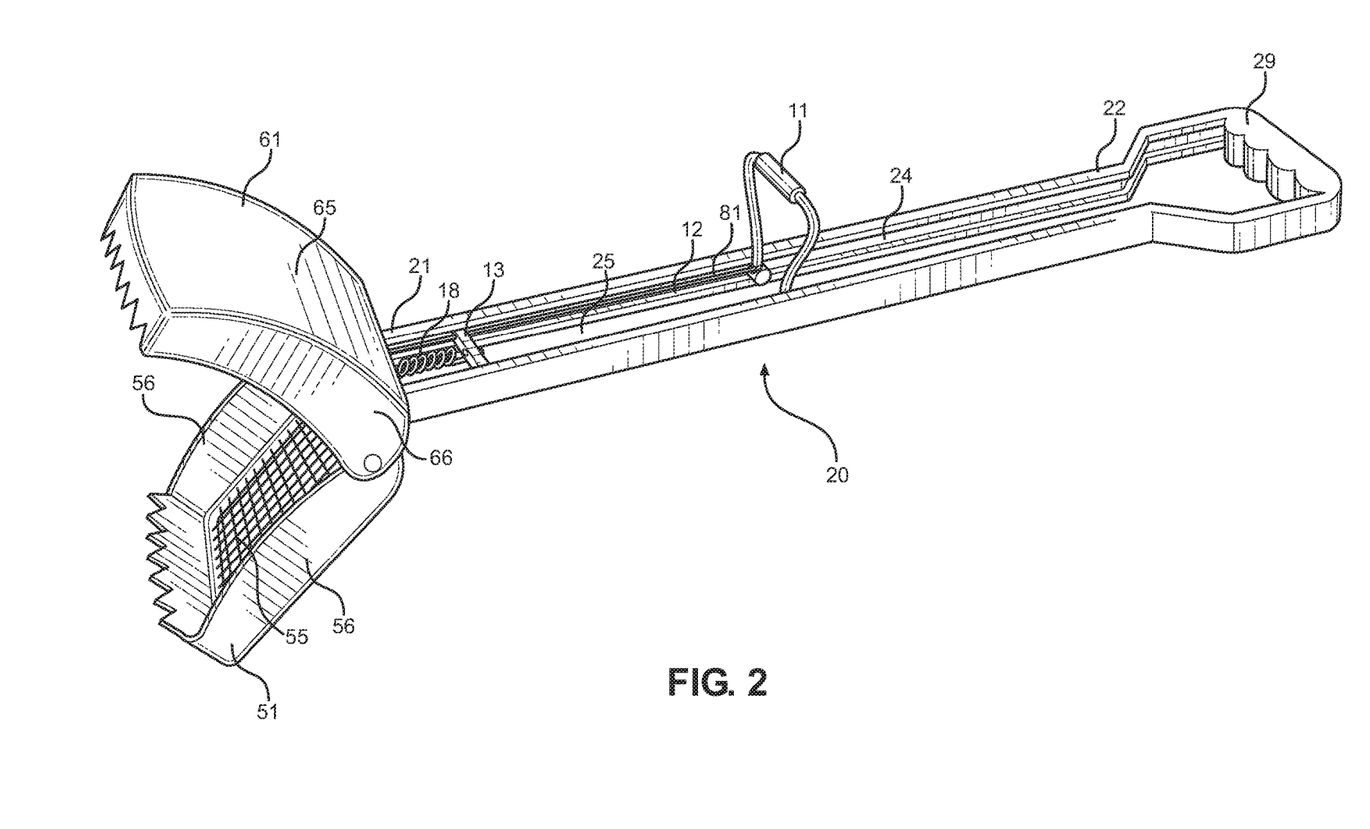
FIG. 2 shows a perspective side view of the sifting pick-up device of the present invention.
Figure 3:
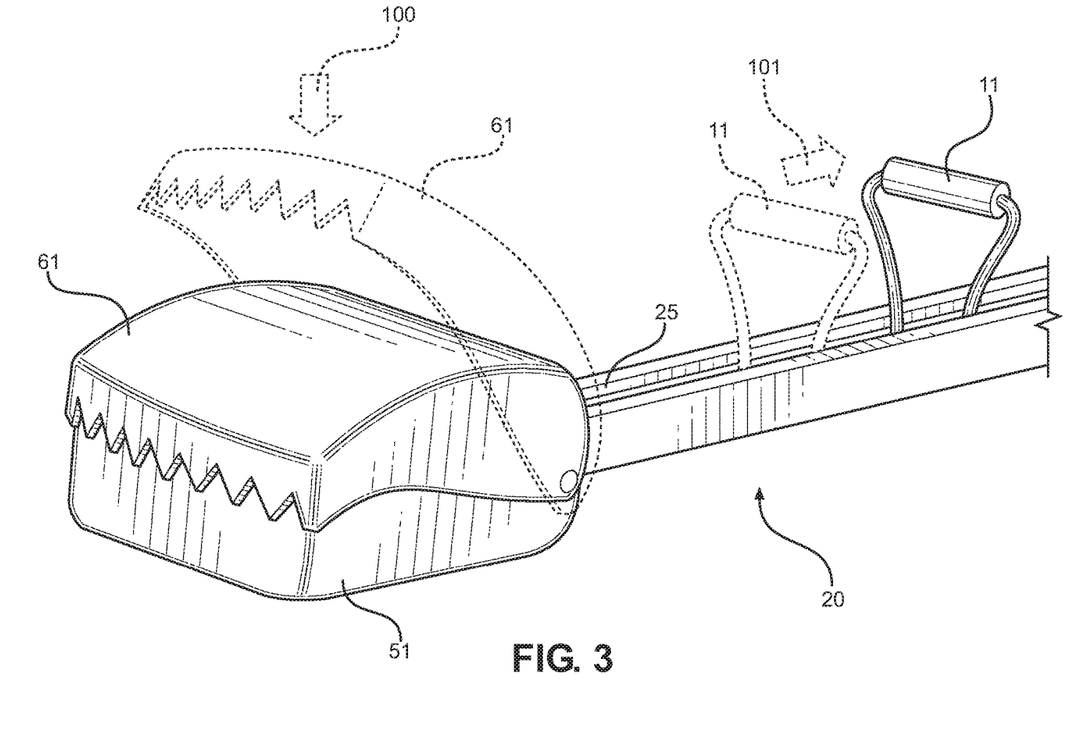
FIG. 3 shows a view of the first jaw member being moved toward the second jaw member as the handle is moved along the elongated frame of the sifting pick-up device.

Referring now to FIGS. 1-3, there are shown view of the sifting pick-up device of the present invention. The device is one that a user manipulates in order to grasp and pick-up various items, typically from a yard or other ground surface. Once grasped, the device can sift the material, dropping loose material and retaining larger portions thereof. One particular use of the device is to pick-up manure and sift out loose grass and hay therefrom. Other uses are contemplated. The device is handheld and manipulated by a user to secure items between its jaw members 51, 61.

The sifting pick-up device comprises an elongated frame 20 having a length, a proximal end 22, and a distal end 21. A user grasps the elongated frame 20 and directs the distal end 21 towards items to be secured. Along the distal end 21 is a first jaw member 61 and a second jaw member 51, whereby the jaw members are movable relative to one another in order secure items therebetween. A slidable handle 11 is disposed along the length of the elongated frame 20, whereby the slidable handle 11 is slidable along the length thereof. In turn, the slidable handle 11 is coupled to at least one of the first jaw member 61 or second jaw member 51, such that movement of the slidable handle 11 in a first direction 101 along the elongated frame 20 moves 100 one or both of the first jaw member 61 and second jaw member 51.

In one embodiment, the handle 11 is connected to one or both of the jaw members 51, 61 via one or more cables 81. The cables 81 are preferably substantially inelastic members comprising a resilient material, such as braided steel cord or the like. The cables 81 extend between the handle 11 and the distal end 21 of the elongated frame 20 such that movement of the handle 11 is coupled to the jaw members 51, 61. Sliding motion of the handle 11 is thus translated into a change in relative position of the first and second jaw members 51, 61. In this embodiment, it is further preferred that the handle 11 be spring biased in order to return the handle 11 to a starting position after it has been moved along the frame 20. Thus, the jaw members 51, 61 are biased to be in a starting position, and movement from this biased position changes the starting position of the jaws. The starting position for the jaws is preferably in an open position as shown in FIGS. 1 and 2.

Referring to FIGS. 1-4, the handle 11 within the frame 20 preferably connects to a rectangular base that slides within a channel 25 in the frame 20. The rectangular base comprises at least two side members 12 and one cross member 13. The side members 12 secure within channels 24 in the open interior 25 of the frame 20 and the cross member 13 extends laterally thereacross. The open interior 25 of the frame 20 is preferably an opening that extends along the length of the frame 20 and accommodates the handle 11, its rectangular base, the cables 81, and a return spring 18 that biases the handle 11. In use, the user handles the device by holding a grip 29 disposed along the proximal end 22 of the frame 20, while simultaneously gripping the handle 11 along the frame length. The user can move the handle 11 relative to the proximal end 22 in order to change the position of the jaw members 51, 61 when attempting to ensnare or grasp an item therebetween.

The pick-up device of the present invention preferably has a first jaw member 61 and a second jaw member 51, whereby the jaw members move relative to one another in order to grasp items as the user coordinates the positioning of the jaw members. In one embodiment, the jaw members 51, 61 each have an upstanding perimeter 56, a rear surface 59, an outer surface, and a jaw surface thereacross. The upstanding perimeters of each jaw either overlap one another or abut against one another when the slidable handle 11 is moved and when the jaws are moved together. Moreover, the jaw surface of at least one of the jaw members 51, 61 further comprises an open, sifting screen surface 55. In one embodiment, the second jaw member 51 has a sifting screen surface 55, while the first jaw member 61 has a solid jaw surface 65.

The jaw surfaces 55, 65 are webs extending across each jaw, and the jaw surfaces 55, 65 may both be sifting screens or only one of the jaw members may be sifting screens. In the latter case, the sifting screen is preferably disposed along the jaw that forms the lower of the two jaw members. That is, the jaw that will accommodate sifting of material 201 from the interior of the jaws using gravity as larger particles 200 are retained on the sifting screen surface 55. In one embodiment of the device, the handle 11 is an upstanding member disposed substantially perpendicular to the frame 20. In this embodiment, the first jaw member 51 is disposed along an opposite side of the frame relative to the handle such that a user grasping the handle 11 and the proximal end of the frame can sift material through the sifting screen 55 of the first jaw member 51, which forms the lower jaw member of the two in this orientation.

The jaw members 51, 61 comprise upstanding perimeters 56, 66, wherein the upstanding perimeters have upper edges 67. The edges either abut one another or overlap when the jaws are in a closed state. In addition the outer edges 58, 68 of the jaw members 61, 51 may further comprise serrated edges in order to improve grasping items with the device. In the closed state, the handle 11 is moved from its starting position and to an extended position. In the extended position, the return spring is elongated and is biasing the handle 11 to return to its starting position. Movement of the slidable handle 11 from the staring position tensions the cables 81 along the frame 20 and draws the jaw members together. Moreover, in the closed state, the first jaw member 61 and the second jaw member 51 form an enclosed interior volume.

Figure 5:
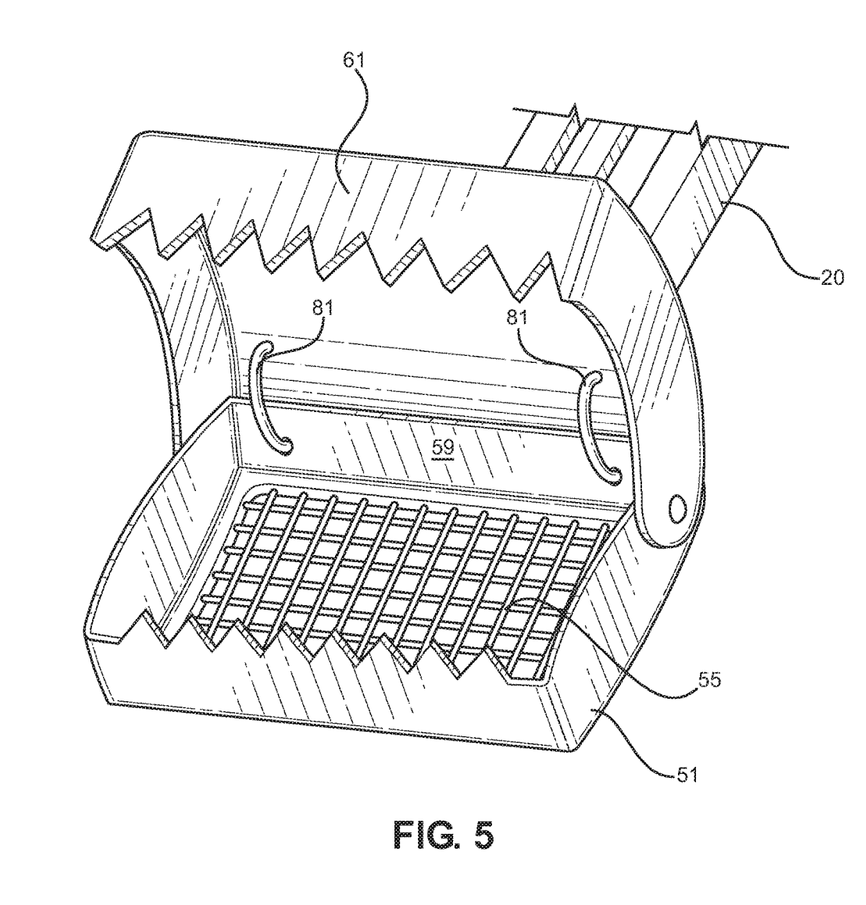
FIG. 5 shows a view of the jaws of the sifting pick-up device of the present invention.

Referring to FIG. 5, there is shown one embodiment of the distal end of the device and the jaw members 51, 61 in an open state. As shown, in this embodiment the cables 81 extend through the rear surface 59 of the second jaw member 61 and connect to the first jaw member 51. When the handle is moved away from the distal end of the frame, the cables 81 are tensioned. The cables 81 then draw the first jaw member 61 towards the second jaw member 51 as the cables 81 are drawn through the frame 20 by the slidable handle. This allows items to be grasped between the jaw members 51, 61, while one or more jaw sifting screen surfaces 55 allow the grasped items to be sifted. This embodiment is but one configuration of the present invention and is not meant to be limiting. The second jaw member 51 may alternatively be drawn towards the first jaw member 61, or the jaw members may both be movable towards one another by way of the cables.

In particular, the first jaw member 61 may be pivotably attached to the distal end of the elongated frame 20 and the second jaw member 51 may be fixed relative to the frame. Alternatively, the second jaw member 51 may be pivotably attached to the distal end of the elongated frame 20 and the first jaw member 61 may be fixed relative to the frame. Finally, the two jaw members 51, 61 may both be pivotably relative to the frame 20 and both move together when the handle is moved.

Figure 4:
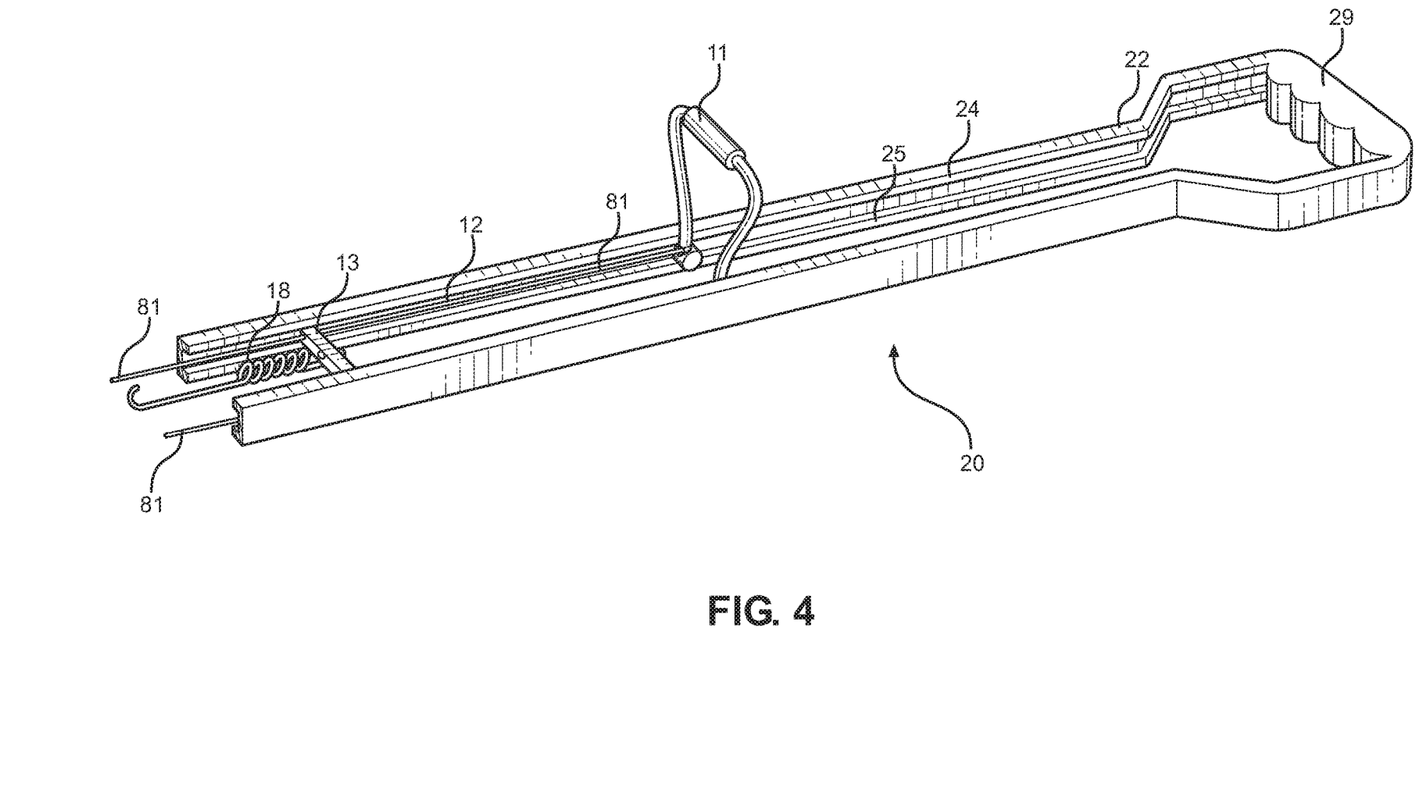
FIG. 4 shows a view of the elongated frame of the sifting pick-up device of the present invention.

In addition, as shown in FIG. 4, the handle 11 may be an upstanding member extending substantially perpendicular to the length of the elongated frame 20. This allows a user to grasp the upstanding handle 11 with one hand while gripping the end grip 29 of the frame 20 along the proximal end 22 thereof. Alternatively, however, the handle 11 may be positioned within the same plane as the elongated frame 20 and move within its open interior 25 (not shown). The handle 11 may be disposed laterally across the open interior of the frame and be substantially parallel to the cross member 13 of its rectangular base. In this embodiment, the handle 11 may also be positioned within the open interior of the end grip 29 along the proximal end 22 of the frame. Thus, a user can grasp the handle 11 within the end grip 29 and draw the handle 11 against the grip, in-plane with the frame 20 and within its open interior.

Overall, the present invention provides an improvement in manure rakes and pick-up tools. The device is beneficial to individual homeowners, and even farmers, equestrians, zookeepers, or any other individuals who boards animals. The manure scooper introduces a more efficient and sanitary way to pick-up animal waste from stalls while sifting the contents thereof. In addition, the present invention provides a general purpose pick-up tool that is unrelated to manure and animal boarding, which may be used for picking-up items from a yard by a homeowner. No claim is made to limit the use of the present invention.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sifting pick-up device, comprising:
an elongated frame having a length, a proximal end, and a distal end;
a first jaw member and a second jaw member disposed along the distal end of the elongated frame;
a slidable handle disposed along the elongated frame, whereby the slidable handle is slidable along the length thereof;
wherein the slidable handle is coupled to at least one of the first jaw member or second jaw member;
whereby movement of the slidable handle in a first direction along the elongated frame is adapted to move the first jaw member relative to the second jaw member;
whereby the slidable handle is spring biased to return to a starting position;
whereby the first jaw member and the second jaw member each further comprises a jaw surface with an upstanding perimeter;
the jaw surface of the first jaw member further comprising a sifting screen wherein the slidable handle is coupled to the first jaw member via one or more cables; and
whereby movement of the slidable handle in the first direction tensions the cables and draws the first jaw member towards the second jaw member.

2. A sifting pick-up device of claim 1, wherein:
the upstanding perimeter of the first jaw member and the upstanding perimeter of the second jaw member overlap one another when the slidable handle is moved in the first direction and when the first jaw member and second jaw member are in a closed state;
the first jaw member and the second jaw member forming an enclosed interior volume when in the closed state.

3. A sifting pick-up device of claim 1, wherein:
the upstanding perimeter of the first jaw member and the upstanding perimeter of the second jaw member align with one another when the slidable handle is moved in the first direction and when the first jaw member and second jaw member are in a closed state;
the first jaw member and the second jaw member forming an enclosed interior volume when in the closed state.

4. A sifting pick-up device of claim 1, wherein:
the elongated frame further comprises an open interior within which the slidable handle slides therein.

5. A sifting pick-up device of claim 1, wherein:
the first direction of the slidable handle is towards the proximal end of the elongated frame.

6. A sifting pick-up device of claim 1, wherein:
the proximal end of the elongated frame further comprises a handle grip.

7. A sifting pick-up device of claim 1, wherein:
the jaw surface of the second jaw member further comprises a solid surface.

8. A sifting pick-up device, comprising: an elongated frame having a length, a proximal end, and a distal end; a first jaw member and a second jaw member disposed along the distal end of the elongated frame; a slidable handle disposed along the elongated frame, whereby the slidable handle is slidable along the length thereof; wherein the slidable handle is coupled to at least one of the first jaw member or second jaw member; whereby movement of the slidable handle in a first direction along the elongated frame is adapted to move the first jaw member relative to the second jaw member; whereby the slidable handle is spring biased to return to a starting position; whereby the first jaw member and the second jaw member each further comprises a jaw surface with an upstanding perimeter; the jaw surface of the first jaw member further comprising a sifting screen; wherein     the slidable handle is coupled to the first jaw member and the second jaw member via one or more cables; and     whereby movement of the slidable handle in the first direction tensions the cables and draws the first jaw member and the second jaw member together.

9. A sifting pick-up device, comprising: an elongated frame having a length, a proximal end, and a distal end; a first jaw member and a second jaw member disposed along the distal end of the elongated frame; a slidable handle disposed along the elongated frame, whereby the slidable handle is slidable along the length thereof; wherein the slidable handle is coupled to at least one of the first jaw member or second jaw member; whereby movement of the slidable handle in a first direction along the elongated frame is adapted to move the first jaw member relative to the second jaw member; whereby the slidable handle is spring biased to return to a starting position; whereby the first jaw member and the second jaw member each further comprises a jaw surface with an upstanding perimeter; the jaw surface of the first jaw member further comprising a sifting screen; wherein     the slidable handle further comprises a rectangular base and an upstanding handle arm;

the elongated frame further comprises an open interior within which the slidable handle slides therein; and     the rectangular base having side members disposed within channels along the open interior of the elongated frame.

10. A sifting pick-up device, comprising: an elongated frame having a length, a proximal end, and a distal end; a first jaw member and a second jaw member disposed along the distal end of the elongated frame; a slidable handle disposed along the elongated frame, whereby the slidable handle is slidable along the length thereof;

wherein the slidable handle is coupled to at least one of the first jaw member or second jaw member; whereby movement of the slidable handle in a first direction along the elongated frame is adapted to move the first jaw member relative to the second jaw member; whereby the slidable handle is spring biased to return to a starting position; whereby the first jaw member and the second jaw member each further comprises a jaw surface with an upstanding perimeter; the jaw surface of the first jaw member further comprising a sifting screen; wherein     the first jaw member is pivotably attached to the distal end of the elongated frame and the second jaw member is fixed relative to the elongated frame.

11. A sifting pick-up device, comprising: an elongated frame having a length, a proximal end, and a distal end; a first jaw member and a second jaw member disposed along the distal end of the elongated frame; a slidable handle disposed along the elongated frame, whereby the slidable handle is slidable along the length thereof;

wherein the slidable handle is coupled to at least one of the first jaw member or second jaw member; whereby movement of the slidable handle in a first direction along the elongated frame is adapted to move the second jaw member relative to the first jaw member; whereby the slidable handle is spring biased to return to a starting position; whereby the first jaw member and the second jaw member each further comprises a jaw surface with an upstanding perimeter; the jaw surface of the first jaw member further comprising a sifting screen; wherein     the second jaw member is pivotably attached to the distal end of the elongated frame and the first jaw member is fixed relative to the elongated frame.

\* \* \* \* \*